United States Patent
Venkateswaran et al.

(10) Patent No.: US 10,236,477 B2
(45) Date of Patent: Mar. 19, 2019

(54) ELECTROCHEMICAL CELLS CONSTRUCTION AND PACKAGING FOR HIGH TEMPERATURE APPLICATIONS

(71) Applicants: Sagar Venkateswaran, Glen Mills, PA (US); Franciscus X. Pratiktohadi, Philadelphia, PA (US)

(72) Inventors: Sagar Venkateswaran, Glen Mills, PA (US); Franciscus X. Pratiktohadi, Philadelphia, PA (US)

(73) Assignee: OPTIXTAL, INC., Philadelphia, PA (US)

( * ) Notice: Subject to any disclaimer, the term of this patent is extended or adjusted under 35 U.S.C. 154(b) by 243 days.

(21) Appl. No.: 15/330,120

(22) Filed: Aug. 10, 2016

(65) Prior Publication Data
US 2018/0047947 A1 Feb. 15, 2018

(51) Int. Cl.
| | |
|---|---|
| *H01M 4/72* | (2006.01) |
| *H01M 2/02* | (2006.01) |
| *H01M 2/04* | (2006.01) |
| *H01M 2/06* | (2006.01) |
| *H01M 2/08* | (2006.01) |
| *H01M 2/26* | (2006.01) |
| *H01M 2/30* | (2006.01) |
| *H01M 10/0525* | (2010.01) |
| *H01M 10/058* | (2010.01) |
| *H01M 10/42* | (2006.01) |
| *H01G 11/14* | (2013.01) |
| *H01G 11/26* | (2013.01) |
| *H01G 11/52* | (2013.01) |
| *H01G 11/58* | (2013.01) |

(Continued)

(52) U.S. Cl.
CPC ......... *H01M 2/0277* (2013.01); *B23K 11/002* (2013.01); *B23K 26/26* (2013.01); *B23K 26/32* (2013.01); *H01G 11/14* (2013.01); *H01G 11/26* (2013.01); *H01G 11/52* (2013.01); *H01G 11/58* (2013.01); *H01G 11/80* (2013.01); *H01M 2/0486* (2013.01); *H01M 2/06* (2013.01); *H01M 2/08* (2013.01); *H01M 2/26* (2013.01); *H01M 2/30* (2013.01); *H01M 4/72* (2013.01); *H01M 10/058* (2013.01); *H01M 10/0525* (2013.01); *H01M 10/425* (2013.01); *B23K 2101/36* (2018.08)

(58) Field of Classification Search
CPC .... H01M 2/0277; H01M 2/0486; H01M 2/06; H01M 2/26; H01M 2/30; H01M 4/72; H01M 10/0525; H01M 10/058; H01M 10/425; H01M 2/08; B23K 2201/36; B23K 11/002; H01G 11/14; H01G 11/26; H01G 11/52; H01G 11/58; H01G 11/80
See application file for complete search history.

(56) References Cited

U.S. PATENT DOCUMENTS

| | | | |
|---|---|---|---|
| 6,445,566 B2 | 9/2002 | Watanabe et al. | |
| 2001/0012193 A1* | 8/2001 | Watanabe | H01G 9/155 361/502 |

(Continued)

*Primary Examiner* — Brittany L Raymond

(57) ABSTRACT

Heat resistant, highly conductive electrochemical cells for high temperature applications are described herein, having at least two electrodes and at least one separator enclosed in heat resistant ceramic enclosure with metalized terminals on its bottom. The electrodes have their tabs welded to inside connectors, and the cells are solderable to circuit boards or various circuits.

11 Claims, 3 Drawing Sheets

1A

(51) Int. Cl.
*H01G 11/80* (2013.01)
*B23K 11/00* (2006.01)
*B23K 26/26* (2014.01)
*B23K 26/32* (2014.01)
*B23K 101/36* (2006.01)

(56) References Cited

U.S. PATENT DOCUMENTS

2012/0106028 A1* 5/2012 Venkateswaran ...... H01G 11/00
                                                      361/503
2015/0174702 A1* 6/2015 Fujimoto .............. B23K 11/115
                                                      428/594

* cited by examiner

ELECTROCHEMICAL CELLS CONSTRUCTION AND PACKAGING FOR HIGH TEMPERATURE APPLICATIONS

BACKGROUND OF THE INVENTION

Field of the Invention

This invention pertains to electrochemical devices, such as ultracapacitors and lithium battery cells, for high temperature processing and applications.

Description of Prior Art

Prior art high temperature electrochemical cells, such as ultracapacitors and lithium battery cells, are used mostly as a memory back up power of semiconductors, and are usually enclosed in a metal casing of a coin shape, having two shells crimped together with an insulating gasket there between. Each shell is in contact with one electrode. The cells are activated by non-aqueous, high temperature electrolyte before crimping. However, these cells are too large for today's printed circuit boards with micro components being soldered to them by wave soldering method, which requires passing the printed board with the micro-components like ultracapacitors through a furnace at high temperature to melt the solder (like 200-230° C.), and they need to have terminals added, which is expensive. This problem was partially addressed by Shunji Watanabe's U.S. Pat. No. 6,445,566. Watanabe teaches ultracapacitor micro-cell, placed in a ceramic square shaped housing pan with metalized inside surface as a collector, connected with a metalized positive terminal on the bottom outside surface. The housing pan has also a metalized rim all around the top, connected with a negative terminal on the bottom outside surface. The housing is closed by a solid metal lid collector in contact with the negative electrode and the rim. Due to moisture sensitive salts presence, the positive and negative electrodes with separator between must be made and stacked into the housing under inert atmosphere which is difficult and expensive. Each electrode layer and the separator layer are already activated by and contain an electrolyte before assembly, which prevents a good conductive contacts of wet electrodes with the collectors, and thus has a poor conductivity. This Patent describes only one cell stacked into this housing design, because the electrodes do not have individual collectors with tabs. The metal lid is electrically connected and sealed to the metalized rim all around by brazing, which is expensive and cumbersome, and may thus create an imperfect seal.

Instant invention overcomes the disadvantages of the prior art and provides easy to make and assemble electrodes in the air, and heat resistant ultracapacitors, asymmetric capacitors, and/or lithium-ion cells with low resistance.

SUMMARY OF THE INVENTION

Now it has been found, that much easier construction and assembly of heat resistant micro-cells having high conductivity can be made by coating the cells electrode's materials with water based binder, in the air, on pretreated aluminum or copper micro-grids' collectors without an electrolyte in the coating. The housing of the cell may be similar to the housing of Watanabe, and may have the metalized inside bottom and the top rim, and the metal lid. The electrodes of the invention have long terminal tabs as an extension of the grid collectors. The terminal tab of the positive electrode is resistance welded in the air to the metalized bottom inside surface of the housing pan, and its long terminal tab is folded under the electrode. The terminal tab of the negative electrode is resistance welded in the air to the metal lid, and later is folded on top of the electrode. Dry, heat resistant porous separator is placed in the air between the electrodes, and the lid is kept open. Because whole assembled cell inside is porous due to the use of the grid collectors, the opened cell is dried under vacuum, and activated by liquid, non-aqueous, high temperature electrolyte in an inert dry atmosphere, and the lid is closed and impermeably sealed by high temperature epoxy adhesive to the rim. The metal lid is additionally secured by several laser tack welds preferably at the corners of the lid, which provides electrical bridge bead contacts to the rim and thus to the negative terminal.

The improvement is in the welded contacts of the metal terminal tabs of the electrodes to the metalized terminals, and in the coated electrodes on micro-grid current collectors. This construction provides stronger and more conductive joints between the electrodes and their terminals.

It is apparent to a person skilled in the art, that several cells can be stacked into the housing and similarly connected by metal welding in parallel for higher capacity, while maintaining high rate capability, as compared to one thick cell. The continuous separator is preferably "Z" folded between the stacked electrodes and is larger than electrodes' active surface to prevent short-circuiting. The metalized connectors, rim and terminals outside are preferably made from selected metals including nickel, tungsten, silver and gold and the metalized bottom inside layer is preferably of aluminum. Because the bottom outside terminals are an integrated part of the receiving housing pan, no additional terminals welded to the housing are needed, which makes the cell more economical. Described cells are solderable to circuit boards and/or other circuits.

The principal object of the invention is to provide non-aqueous, low cost and low impedance cells for high temperature applications.

Another object of the invention is to provide high temperature resistant ultra-capacitors and micro-batteries which are easy to assemble.

A further object of the invention is to provide high temperature micro-cells which are solderable.

A further object of the invention is to provide high temperature micro-cells which are solderable by wave soldering method and by heating the cells in an oven.

A further object of the invention is to provide high temperature micro-cells which can be mass produced by automation.

Other objects and advantages of the invention will be apparent from the description and appended claims.

BRIEF DESCRIPTION OF THE DRAWINGS

The nature and characteristic features of the invention will be more readily understood from the following description taken in connection with the accompanying drawing forming part thereof, in which.

It should, of course be understood that the description and drawings herein are merely illustrative, and that various modifications, combinations, and changes can be made in the structures disclosed without departing from the spirit of the invention.

DETAILED DESCRIPTION OF THE PREFERRED EMBODIMENTS

When referring to the preferred embodiments, certain terminology will be utilized for the sake of clarity. Use of such terminology is intended to encompass not only the described embodiments, but also technical equivalents, which operate and function in substantially the same way to bring about the same result.

Figure 1:
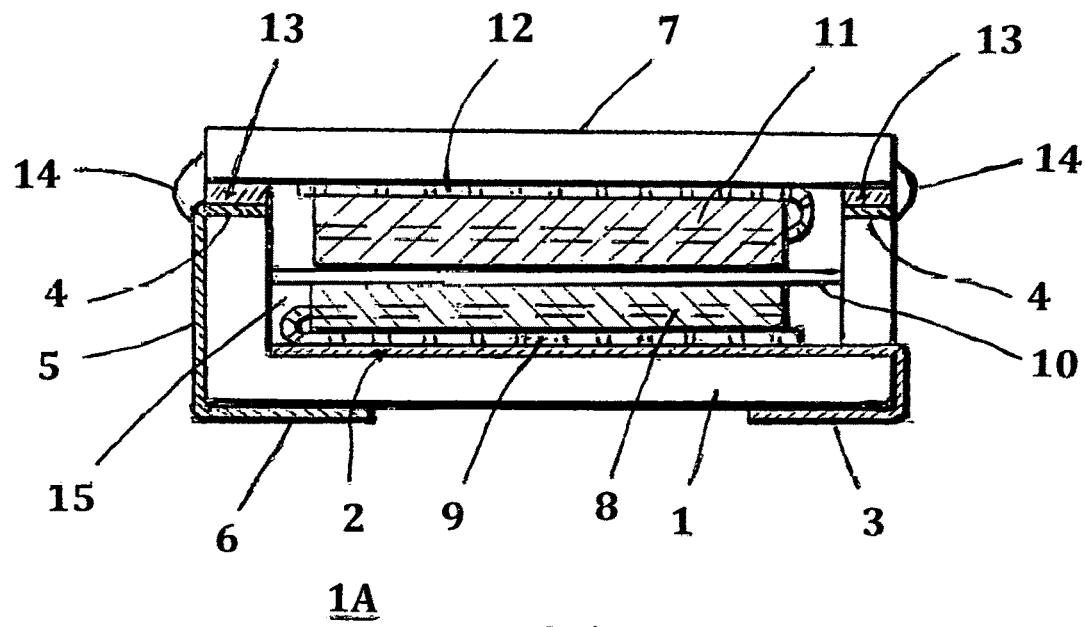
FIG. 1 illustrates sectional side view of high temperature resistant cell of the invention inside of high temperature resistant housing, showing their components.
Figure 2:
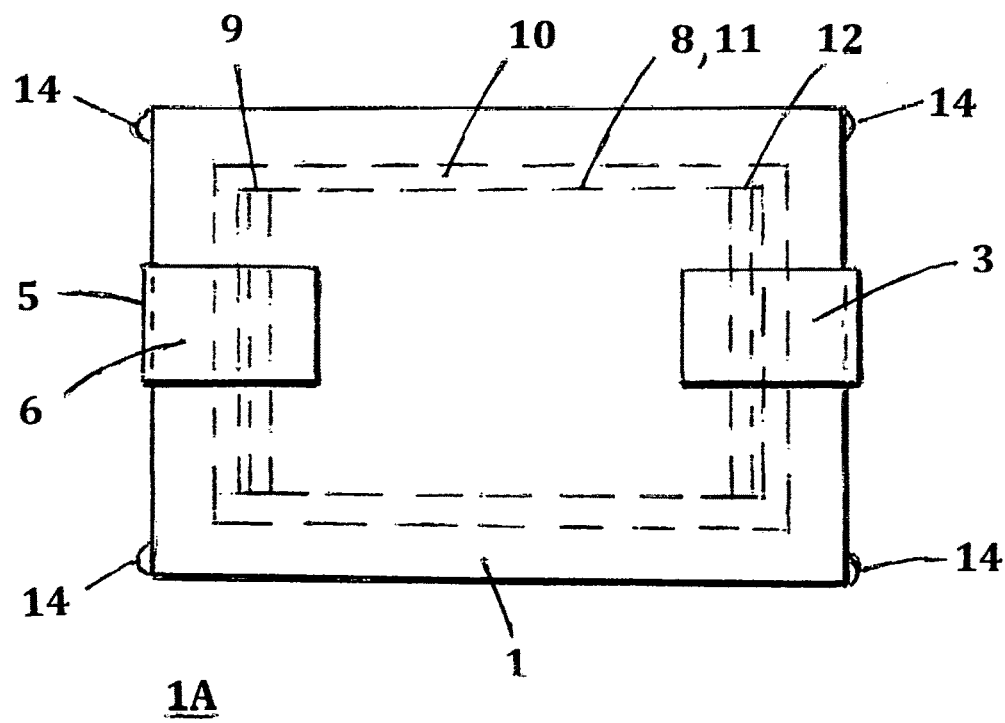
FIG. 2 illustrates bottom view of high temperature resistant housing, having metalized terminals thereon, and electrodes with separator inside.

Referring now in more detail and particularly to FIGS. 1 and 2, which is one embodiment of the invention, showing cross-sectional and bottom view of a non-aqueous, high temperature cell 1A like ultracapacitor, asymmetric ultracapacitor, or lithium ion cell, which comprises:

Preferably electrically insulating ceramic, glass, or high temperature resistant polymer, square pan shaped housing 1, with metalized, preferably aluminum inside bottom layer 2, electrically connected to metalized positive terminal 3, on the outside bottom of the pan housing 1; metalized rim 4, all around the top of the housing 1; metalized connector 5, connecting the rim 4 with metalized negative terminal 6 on the outside bottom of the pan housing 1; preferably nickel metal lid 7, connected all round to the rim 4 by epoxy adhesive hermetic seal 13, and by laser metal weld beads 14 at several places of the lid 7; positive electrode 8 with preferably aluminum micro-grid long tab 9, resistance welded to the layer 2 and folded between the electrode 8 and the layer 2; high temperature resistant electrically insulating porous separator 10; negative electrode 11 with preferably aluminum or copper micro-grid long tab 12, resistance welded to the lid 7, and high temperature resistant electrolyte 15 soaked into the cell's electrodes 8 and 11 and separator 10, before closing and hermetically sealing the lid 7 in an inert atmosphere. Because the electrodes 8 and 11 are porous, due to their micro-grids 9 and 12 presence, as well as the separator 10 is porous, the whole cell inside of the housing 1 is porous, and thus can be activated by the liquid electrolyte 15. Because the electrolyte 15 contains high boiling solvents (240° C. boiling point) and high temperature salts, which withstand a higher temperature than melting point of solder, the described cell can be used with a wave soldering process, and melting the solder joints at the terminals 3 and 6 in an oven. It should be noted that the separator 10 is larger than the electrodes 8 and 11 active surfaces to prevent short-circuiting. The separator should have the same footprint as the inside of the bottom surface of the pan housing 1. High temperature porous separator 10 can be of porous Teflon, polyamide non-woven or glass non-woven materials. It is self-evident that the resistant welding of the tabs 9 and 12 to the metalized layer 2 and to the lid 7 provides for a superior conducting, i.e., low impedance, as compared to the wet contact of the electrodes with collectors, in the prior art.

Preferred ceramic for the housing 1 is alumina. The pan housing 1 and the lid 7 are not limited to have just square footprint, but may have also rectangular, round, or oval footprint. Preferred high temperature electrolyte solvents for ultracapacitors may be PC (propylene carbonate), and for lithium ion cells may be EC (ethylene carbonate), and PC mixture (240° C. boiling point). Preferred salt in the ultracapacitors electrolyte is $TEMABF_4$. Preferred salt in the lithium ion cell electrolyte is $LiBF_4$. Preferred metalizing metals are aluminum inside, and nickel, silver and gold on the outside surfaces. Using the epoxy seal 13 between the rim 4 and the lid 7 is much easier than brazing, and then the metal laser welding of "bridge" beads 14 in the air is also easier, and conduct electrically over the epoxy in several places, and prevent any delamination of the lid 7.

Figure 3:
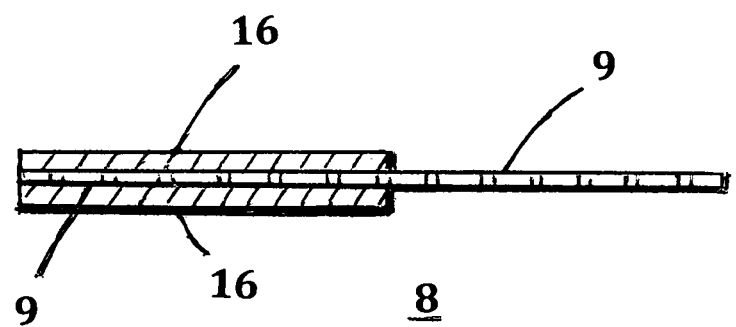
FIG. 3 illustrates sectional side view of typical electrode of the high temperature cell of the invention, having active materials coated on metal grid.
Figure 4:
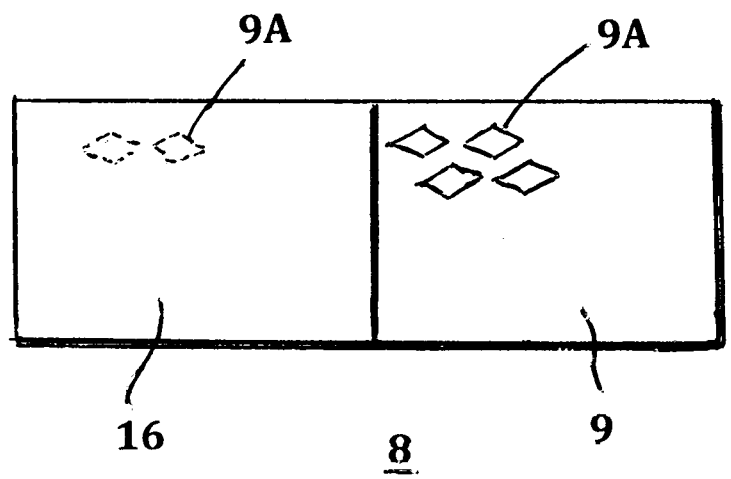
FIG. 4 illustrates top view of the electrode shown in FIG. 3.

Referring now to FIGS. 3 and 4, which is another embodiment of the invention, showing typical ultracapacitor dry electrode 8 of the cell described above. The electrode material 16 is coated on both sides of a pre-treated aluminum or copper micro-grid collector 9 by an environmentally friendly process, in the air (=easier and cheaper). The coating slurry contains water as a solvent, gelling agent, active material, high surface carbon black and a water soluble binder. The water is evaporated and the coating is thus solidified. The coating does not contain electrolyte. The micro-grids may be also coated only on one side, preferably facing the separator (not shown).

The pre-treatment of the aluminum grid is a dry thin coat on the grid surface, based on Polaqua acrylic, water based polymer mixed with high surface carbon. This treatment protects the grid from corrosion and improves contact conductivity of the active material 16 with the collector 9. The electrode has a long tab 9, which is a continuation of the collector 9. The direction of diamond shaped grid holes 9A is shown.

In lithium-ion cells, the copper grid is similarly coated with a negative material such as graphite, and copper grid is pretreated with a thin coat of polyvinyldiene fluoride homopolymer plus carbon in acetone and NMP, and baked at 240 C. Pretreated aluminum grid is coated with a positive material, such as a lithiated metal oxide. For both active materials, the solvent, carbon and the binder is the same as above for ultracapacitor cells. In both types of the cells, the electrodes and the separator are vacuum dried before activation with the heat resistant electrolyte 15.

Figure 5:
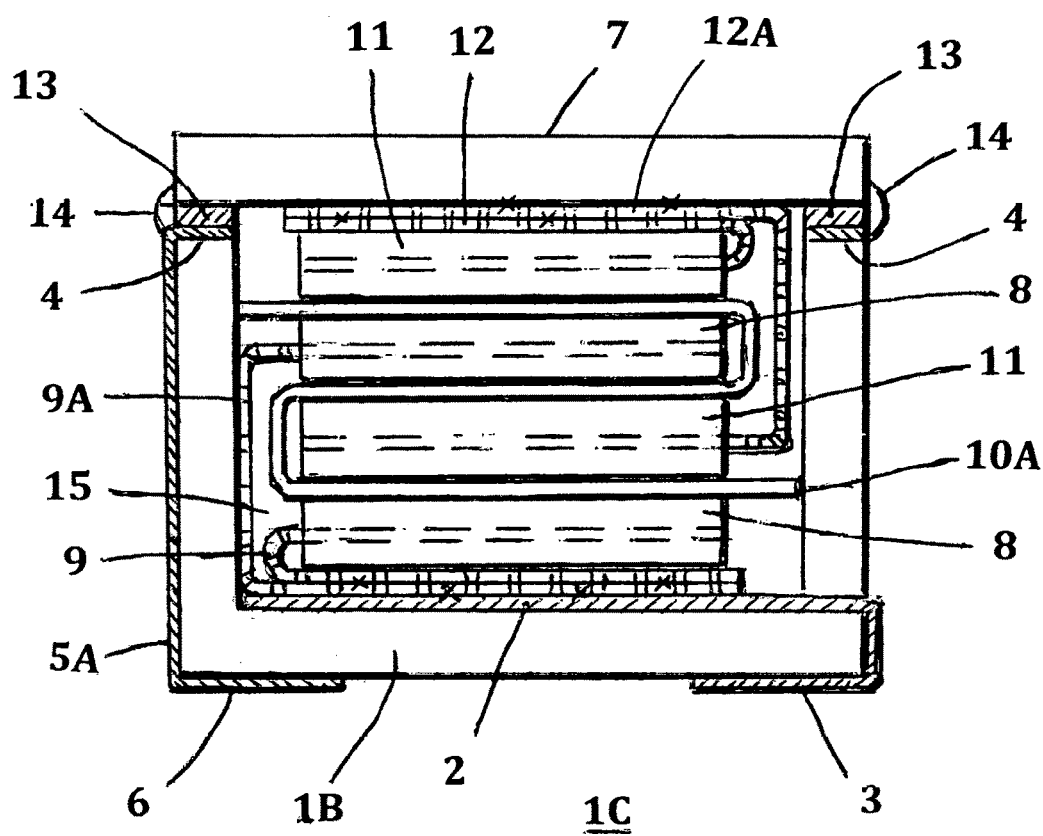
FIG. 5 illustrates sectional side view of high temperature resistant multi-cell assembly inside of high temperature resistant housing, showing their components.

Referring now to FIG. 5, which is another embodiment of the invention, showing cross sectional view of a non-aqueous, high temperature multi cell assembly 1C, which comprises:

Preferably ceramic square pan shaped housing 1B, with preferably metalized aluminum inside bottom layer 2 electrically connected to metalized positive terminal 3, on the outside bottom of the pan housing; metalized rim 4 all around on the top of the pan housing 1B; metalized connector 5A, connecting the rim 4 with metalized negative terminal 6; preferably nickel metal lid 7, connected to the all around metalized rim 4 by epoxy adhesive seal 13 and by laser metal weld beads 14 at several places of the lid 7; two positive electrodes 8 with preferably aluminum micro-grid long tabs 9 and 9A, resistance welded to the layer 2 and folded; high temperature resistant, electrically insulating, porous separator 10A; two negative electrodes 11 with preferably aluminum micro-grids long tab 12 and 12A, resistance welded to the lid 7 and folded; and the high temperature resistant electrolyte 15, soaked into the electrodes 8 and 11 and separator 10A, before closing and sealing the lid 7, in an inert atmosphere. Because the electrodes 8 and 11 and separator 10A are porous, the whole stack of cells inside of the housing 1A is porous, and thus can be activated by the liquid electrolyte 15. The advantage of this design over the prior art is in its ability to stack more than one cell into the housing 1B, due to having long tabs on the electrodes 8 and 11, which prior art does not have. Having more cells connected in parallel increases capacity and maintains high rate capability over one thicker cell of prior art. The long separator 10A is preferably "Z" folded between the electrodes as shown, to prevent short circuiting. All other features and materials described above for the cell 1A remains the same for this multi cell 1C. The multi cell 1C is also vacuum dried before the activation with electrolyte 15, and closing and sealing the lid 7.

The described electrochemical cells can withstand not only the described high temperatures of soldering, but also can operate in these temperatures, up to 235 C. It will thus be seen, that lower cost, easier assembly, and highly conductivity electrochemical cells for high temperature applications are herein described with which the objects of the invention are achieved.

We claim:

1. A heat resistant electrochemical cell comprising at least two porous electrodes with flat metal micro-grid current collectors and flat long tabs;

at least one heat resistant electrically insulating porous separator between said electrodes; and heat resistant non-aqueous electrolyte in contact with said electrodes and said separator; and which cell is sealed in an insulating heat resistant and moisture proof enclosure, having metalized and metal connectors on its inside and outside surfaces connected to one positive and one negative metalized terminals on its bottom surface, and said tabs are electro-conductively welded inside to said connectors and folded, and which connectors are exiting from said enclosure in sealed manner; and said enclosure has metalized top rim with a solid metal lid-attached and permeably sealed to said metalized rim by a heat resistant adhesive, and electro conductively attached by laser tack weld metal beads.

2. A heat resistant electrochemical cell as described in claim 1, in which said enclosure has a pan shaped housing of ceramic material having top rim and bottom inside and outside surfaces selectively metalized to connect only said bottom inside metalized surface with said outside positive terminal, and to connect only said top rim metalized surface with said outside negative terminal.

3. A heat resistant electrochemical cell as described in claim 2, in which said housing has a footprint selected from the group including: square, rectangular, circular and oval foot print.

4. A heat resistant electrochemical cell as described in claim 2, in which said inside bottom metalized surface is of aluminum.

5. A heat resistant electrochemical cell as described in claim 2, in which said outside metalized surface of said container, and said metal lid are selected from a group including: nickel, silver, and gold.

6. A heat resistant electrochemical cell as descried in claim 2, in which said housing's ceramic is alumina.

7. A heat resistant electrochemical cell as described in claim 1, in which said cell is an ultracapacitor.

8. A heat resistant electrochemical cell as described in claim 1, in which said cell is a lithium ion battery.

9. A heat resistant electrochemical cell as described in claim 1, in which said micro-grid collectors are selected from aluminum and copper metals.

10. A heat resistant electric cell as described in claim 1, in winch said cell is a parallel multi-cell.

11. A heat resistant electrochemical cell as described in claim 1, in which said cell is solderable to various circuits.

* * * * *